United States Patent [19]

Best et al.

[11] Patent Number: 4,876,617

[45] Date of Patent: Oct. 24, 1989

[54] SIGNAL IDENTIFICATION

[75] Inventors: Stuart J. Best; Reginald A. Willard, both of Hayes, England

[73] Assignee: Thorn Emi plc, London, England

[21] Appl. No.: 46,126

[22] Filed: May 5, 1987

[30] Foreign Application Priority Data

May 6, 1986 [GB] United Kingdom ................. 8611014

[51] Int. Cl.⁴ .......................... G11B 15/04; G11B 5/62

[52] U.S. Cl. .......................................... 360/60; 360/68

[58] Field of Search ....................... 455/68, 70; 360/49, 360/48, 40, 60, 67, 68

[56] References Cited

U.S. PATENT DOCUMENTS 3,845,391 10/1974 Crosby .................................. 325/64

4,225,967 9/1980 Miwa et al. ............................ 455/68

4,245,347 1/1981 Hurron et al. ......................... 455/68

*Primary Examiner*—Vincent P. Canney

*Attorney, Agent, or Firm*—Fleit, Jacobson, Cohn, Price, Holman & Stern

[57] ABSTRACT

Equipment for labelling audio signals with identification information has an encoder which inserts the binary information into two very narrow notches of center frequencies 2883 and 3417 Hz, between semi-tones in the tonic scale to minimize music breakthrough into the decoding circuits, and to ensure that no fundamental frequencies in the tonic scale will be excluded in the reproduction. The notches are derived from a 3-stage biquad filter, and are approximately 50 dB deep and 150 Hz wide at the top. The encoder includes a wide bandpass circuit consisting of a 1 KHz highpass filter and a 6 KHz lowpass filter introduced to ensure that the code insertion level is not determined by frequencies, either high or low, which do not adequately mask the code frequencies. The code amplitude is kept a fixed level below the programme, initially adjustable by a suitable control. The code sequence has an addressing preamble consisting of a simultaneous burst of both the lower and higher frequencies for a period of 8 digits, followed by a message portion of 40 bits formed of an appropriate stream of the two frequencies.

4 Claims, 5 Drawing Sheets

SIGNAL IDENTIFICATION

The present invention relates to a labelling of signals to enable subsequent identification.

The present invention is particularly, but not solely, applicable to the labelling of audio and/or video sound track recordings such as to indicate the origins of the recordings, or the owner of the copyright in the recordings, or both. The labelling may also provide information as to payment of copyright royalties due.

U.S. Patent Specification No. 3845391 describes a conventional technique for incorporating an identification code in audio signals.

The present invention provides apparatus for the labelling of signals, the equipment comprising means to produce a code sequence incorporating a sequence-identification portion and a message portion, the message portion formed of a plurality of bits, one value of bit being represented by a burst of one predetermined frequency and the other value of bit being represented by a burst of another predetermined frequency different from the first predetermined frequency, the sequence-identification portion of the code sequence incorporating a burst of both frequencies, and means to insert the code sequence into a signal.

Preferably, the apparatus has means to monitor the frequency range and/or the amplitude of the signal for labelling, and means to inhibit insertion of the code sequence when the monitoring means indicates a value below a specified level.

Preferably, the inhibit means is operable to prevent insertion when the signal substantially consists of frequencies below 1 KHz and/or above 6 KHz.

Preferably, the apparatus has means to locate one section of the code sequence in a channel of a multiple-channel signal and another section, following on from the said one section, of the code sequence in a different channel of the multiple-channel signal.

According to another aspect, the present invention also provides decoder apparatus for signals incorporating labelling, the equipment including means for monitoring a signal for a sequence-identification portion of a code sequence, and means to extract a message portion from the code sequence, the message portion formed of a plurality of bits, one value of bit being represented by a burst of one predetermined frequency and the other value of bit being represented by a burst of another predetermined frequency different from the first predetermined frequency, the sequence-identification portion of the code sequence incorporating a burst of both frequencies.

Preferably, the decoder apparatus has means to assemble successive portions of the code sequence located in different channels of a multiple-channel signal.

According to another aspect, the present invention also provides a recording of a signal, the recording having at least one code sequence incorporating a sequence-identification portion and a message portion, the message portion formed of a plurality of bits, one value of bit being represented by a burst of one predetermined frequency and the other value of bit being represented by a burst of another predetermined frequency different from the first predetermined frequency, the sequence-identification. portion of the code sequence incorporating a burst of both frequencies.

In order that the invention may more readily be understood, a description is now given by way of example only, reference being made to the accompanying drawings in which FIGS. 1 and 3 are block circuit diagrams of an encoder embodying the present invention;

Figure 1:
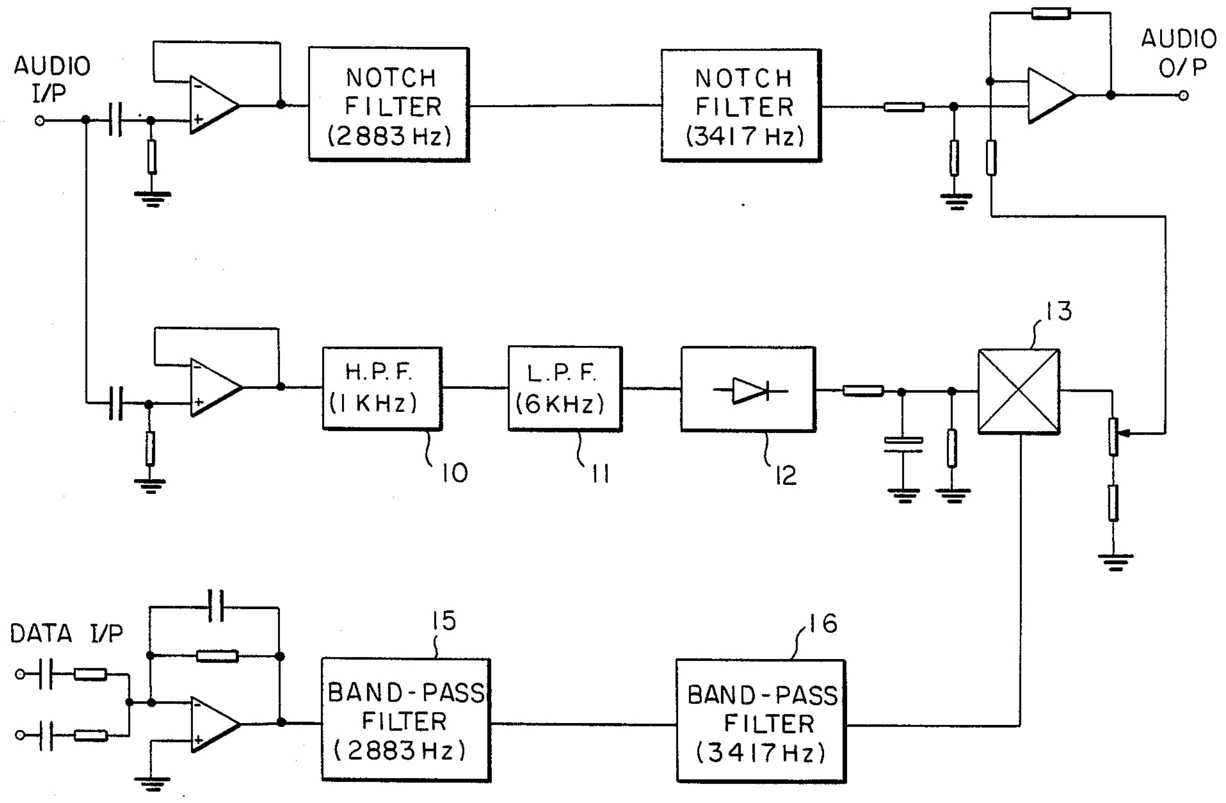
Figure 2:
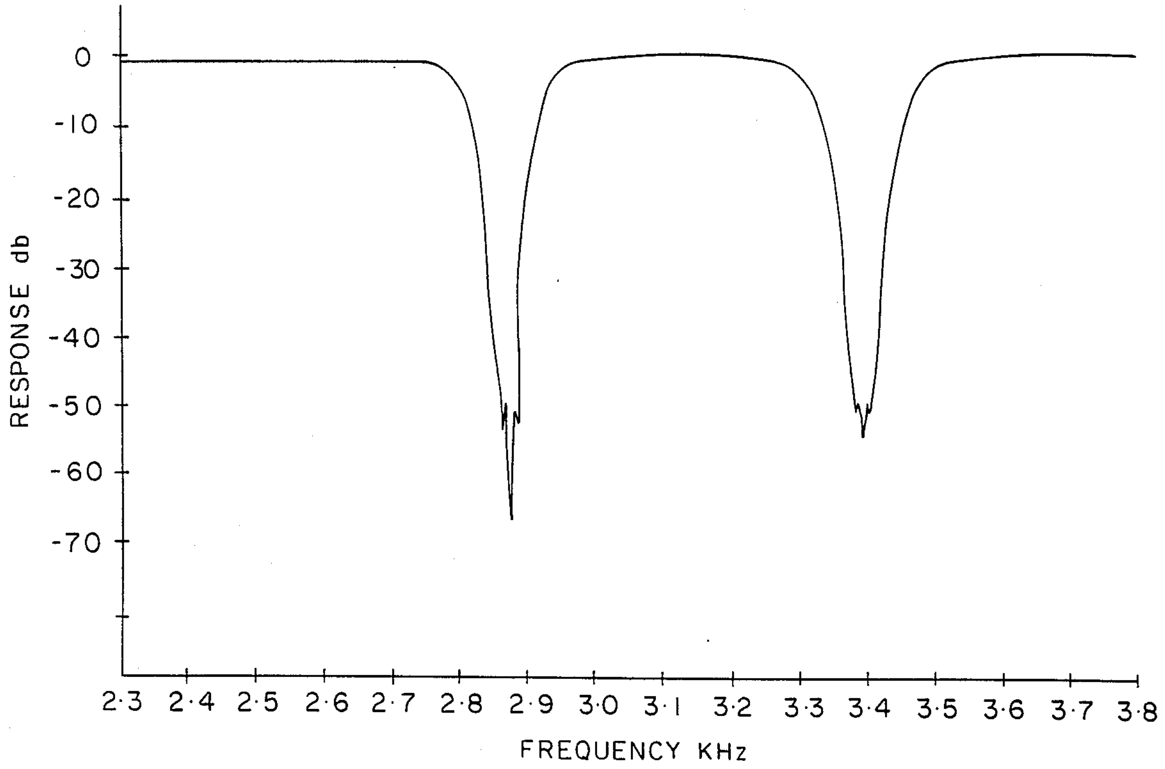
FIG. 2 is a response curve of an element in the encoder of FIG. 1.
Figure 3:
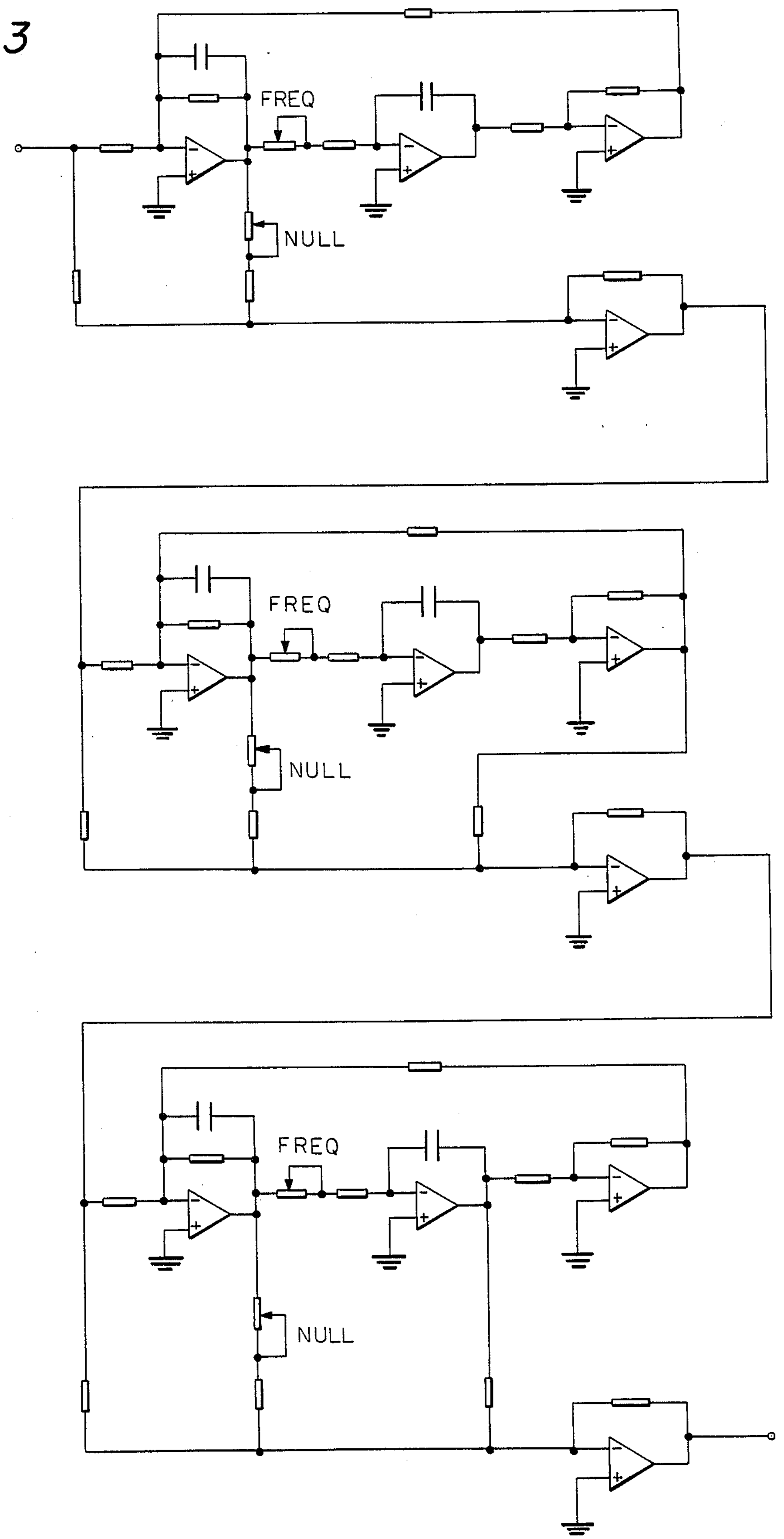

The encoder shown generally in FIG. 1 inserts the binary information into two very narrow notches, to facilitate the decoding process, making it much easier to identify the individual digits within the code. The centre frequencies chosen for the two notches, 2883 and 3417 Hz are between semi-tones in the tonic scale. This is helpful in minimising music breakthrough into the decoding circuits, and ensures that no fundamental frequencies in the tonal scale will be excluded in the reproduction. The notches, illustrated in FIG. 2, are derived from a 3-stage biquad filter (FIG. 3), and are approximately 50 dB deep and 150 Hz wide at the top, such as to minimise the amount of programme lost while limiting the amount of programme adjacent to the code frequencies passed by the decoder bandpass filter.

The control branch of the encoder (centre limb of FIG. 1) includes a fairly wide bandpass circuit consisting of a 1 KHz highpass filter 10 and a 6 KHz lowpass filter 11 introduced to ensure that the code insertion level is not determined by frequencies, either high or low, which do not adequately mask the code frequencies. Thus if the programme content consists mainly of either high or low frequencies, even though the level is high, the code will be suppressed.

The envelope of the programme signal is rectified by unit 12 and applied to a multiplier 13 with the code frequencies applied to the other input. Thus the amplitude of the code may be kept a fixed level below the programme, initially adjustable by a suitable control. The code frequencies are derived from a timing generator and are transformed from square to sinusoidal waveform in the two bandpass filters 15 and 16.

The code sequence includes a part of 40 digits each with a period of 22 msec; a digit with the lower frequency designates an 0, and a digit with the higher frequency designates a 1. The code sequence is addressed by a simultaneous burst of both the lower and higher frequencies for a period of 8 digits, i.e. $8\times22$ msec $=176$ msec. In order to afford some separation between code sequences there is a blank space equivalent to 16 digits, i.e. $16\times22$ msec $=350$ msec. The repetition rate is therefore:

| | | | |
|---|---|---|---|
| Address length | = | 8 digits | |
| Main part | = | 40 digits | |
| Space between sequences | = | 16 digits | |
| Total | | 64 digits | |
| | | 64 × 22 msec = | 1.41 1.41 sec |

Figure 4:
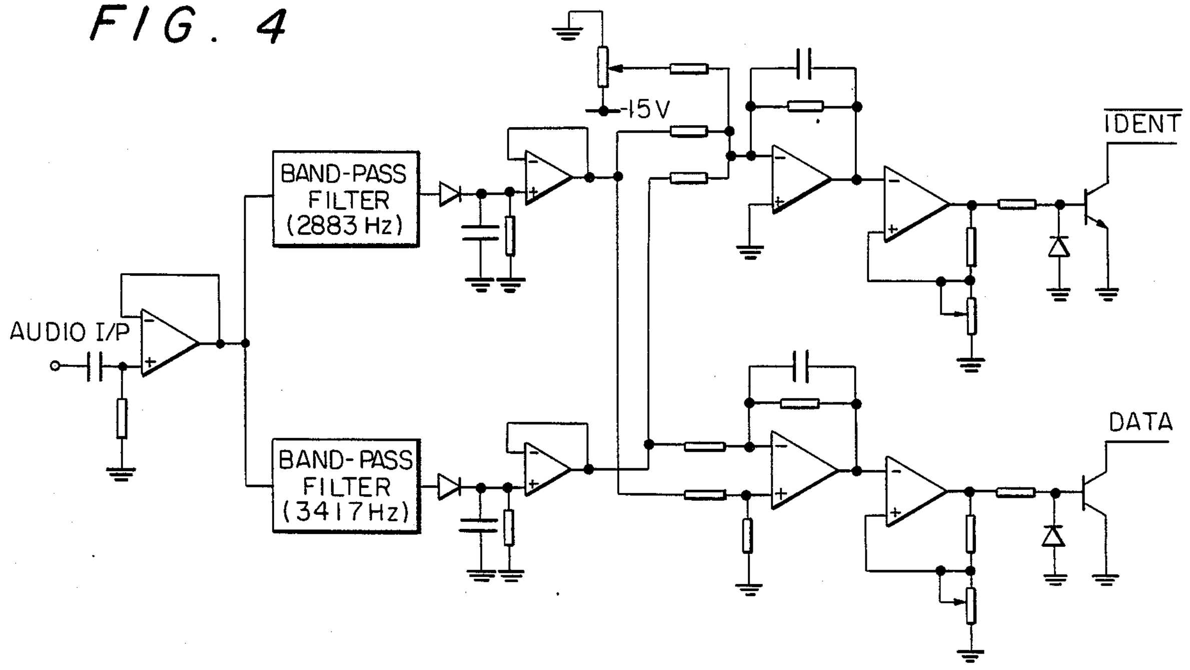
FIG. 4 is a block circuit diagram of a decoder embodying the present invention.
Figure 5:
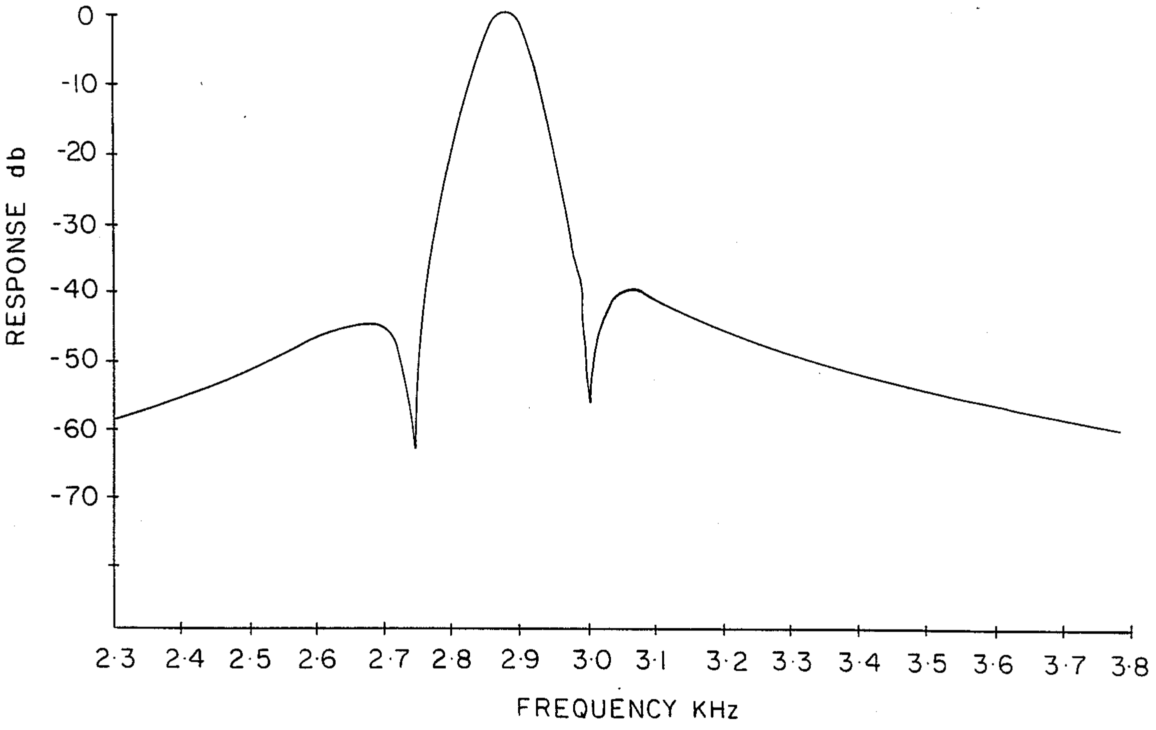
FIG. 5 and 6 are response curves of elements in the decoder of FIG. 4.
Figure 6:
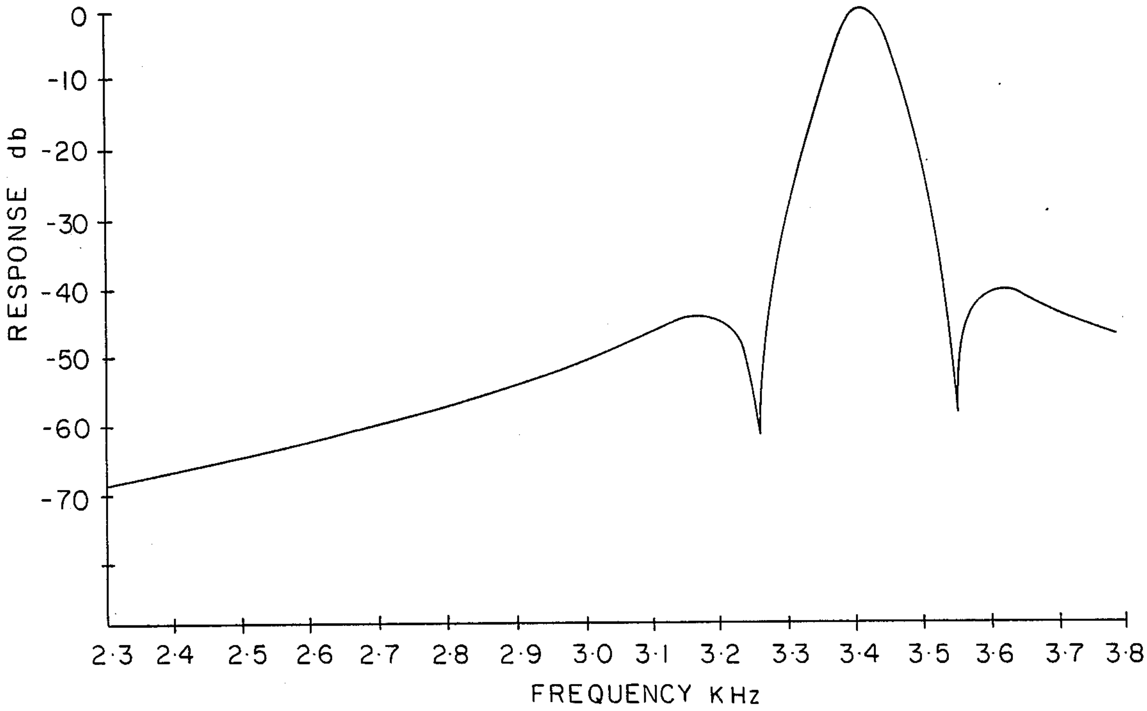

The function of the decoder shown generally in FIG. 4 is essentially to separate the code from the programme, then separate the address from the main part of the code sequence and subsequently present the retrieved code sequence for display. The code separation is achieved by two bandpass filters, one having response characteristics as shown in FIG. 5 such as to pass the lower frequency, the other having response characteristics as shown in FIG. 6 such as to pass the higher frequency. The shape of the responses of these filters determines, to a large extend, the parameters of the system; the sharper they are (i.e. high Q), the longer it takes for the code frequency to propagate through them and therefore, in order to get a usable output the longer must be the period of the individual digits (number of cycles of the appropriate frequency). Also, the higher the Q of the filter, the less tolerance there will be to code frequency shift due to speed variations of the reproducing equipment, either accidental or deliberate; however, typically the reproducing equipment is of professional standard and therefore limits any speed variation and consequent pitch change to a fairly low figure. The wider the response of the filters the more programme breakthrough will be present to interfere with the accurate retrieval of the code. Prior to the filters, an A.G.C. Circuit lifts the lower levels in the applied signal, tending to make the input to the filters a constant level. Following the output of each filter a rectifier circuit follows the envelope of the retrieved code which then forms the input to a sum and difference circuit. Since the address will appear at the output of the filters as two in-phase pulses 8 digits in duration, the output from the summing amplifier will be a double amplitude pulse. Conversely, the code sequence which appears as complementary bit streams at the output of the filters will cancel in the summing amplifier. The opposite action occurs within the difference amplifier where the code amplitude is doubled but the address is cancelled. Thus the address appears at the output of the summing amplifier and the code sequence at the output of the differencing amplifier. In this embodiment, only the lefthand channel has been encoded leaving the righthand channel untouched. The values of frequency used in the code sequence are particularly beneficial because of their position in the tonic scale, and because it is considered that frequencies between 2 and 4 KHz are the most susceptible to programme masking. Also, the values are an optional choice bearing in mind that the lower the frequency the smaller the number of cycles that may be transmitted in a given time which would lead to longer periods per digit being required to ensure code retrieval, and at higher frequencies masking by the programme contents becomes much less effective. If the audio envelope amplitude falls below a predetermined level the code insertion is suppressed. Because of this, the code is only inserted into the programme when its content, both from the point of view of level and frequency distribution, will provide adequate masking of the code. It is not therefore inserted during any momentary breaks in the flow of programme information nor when the code level falls below a predetermined value such that programme "breakthrough" will override the code. Breakthrough occurs when frequencies in the programme adjacent to the code frequencies are not adequately filtered out in the decoder and are falsely recognised by the code sensing circuits as code. Music breakthrough can occur both to give an entirely false output and also to cause mutilation of the code. The higher the permissible insertion level of the code the less likely this malfunction is liable to occur. The decoder may be arranged to operate such that the entirely false code is disregarded by the decoder if the code is not preceded by the correct address. Sometimes the code sequence is incomplete because during its insertion the programme level has dropped below the acceptable masking level. Thus the decoder ignores the mutilated code by checking for check bits in (or at the end of) the code. With the inclusion of a 40 bit code every 1.41 seconds the decoder can correctly recover the code at adequately frequent intervals to make the system feasible whatever the programme content.

The equipment described in relation to FIGS. 1 to 6 may be modified to reduce any effects of programme breakthrough into the code discrimination circuits. Whereas this could readily be achieved by widening the notches, it is considered that the barest minimum of the programme content should be removed in order to insert the code. Ideally the decoder bandpass filters should substantially mirror the notch filters to exclude all music breakthrough, but this, however, would leave no allowance for speed variations in he reproducing equipment. In the described equipment approximately "±3%" speed variation can be tolerated. This may have to be reduced in order to allow the passband to be reduced.

The described equipment can be modified to accommodate a stereo signal with the consequent doublings of coded information. This can improve the rate of capture of correct code sequences. The modification is such that, when the channels are combined to form a mono channel, the code does not become obtrusive or become mutilated in any way.

The present invention is applicable to equipment incorporating digital signal processing. Indeed, many of the signal processing functions used in the present invention can be readily implemented digitally (for example complex filtering functions) and may reduce problems associated with noise, particularly with the availability of 32 bit DSP chips. Moreover, digital techniques may allow delays to be readily introduced into the encoding system so that the validity of the code may be tested before transmission. In a digital decoder with the advantage of storage, it is readily possible to work at lower coding levels and employ a signal averaging technique to retrieve the code from noise level.

It is envisaged that, at least initially, the audio programme will be received as an analogue signal from which the decoder extracts the digital code and the resulting information is then passed directly to a computer or appropriate processing equipment.

Because of the constraints due to programme masking which apply to this system, preferably the code sequence is as short as possible. As, in preferred embodiments, the digital signal decoded from the programme is handled by some form of computer, the latter holds in store all the detailed necessary information suitably catalogued such that the appropriate information can be recalled by an abbreviation incorporated in the code sequence. Thus using abbreviations in the code sequence of 20 digits length, the system has a capacity of $2^{20}$ (namely over 1 million) possible identities.

Figure 7:
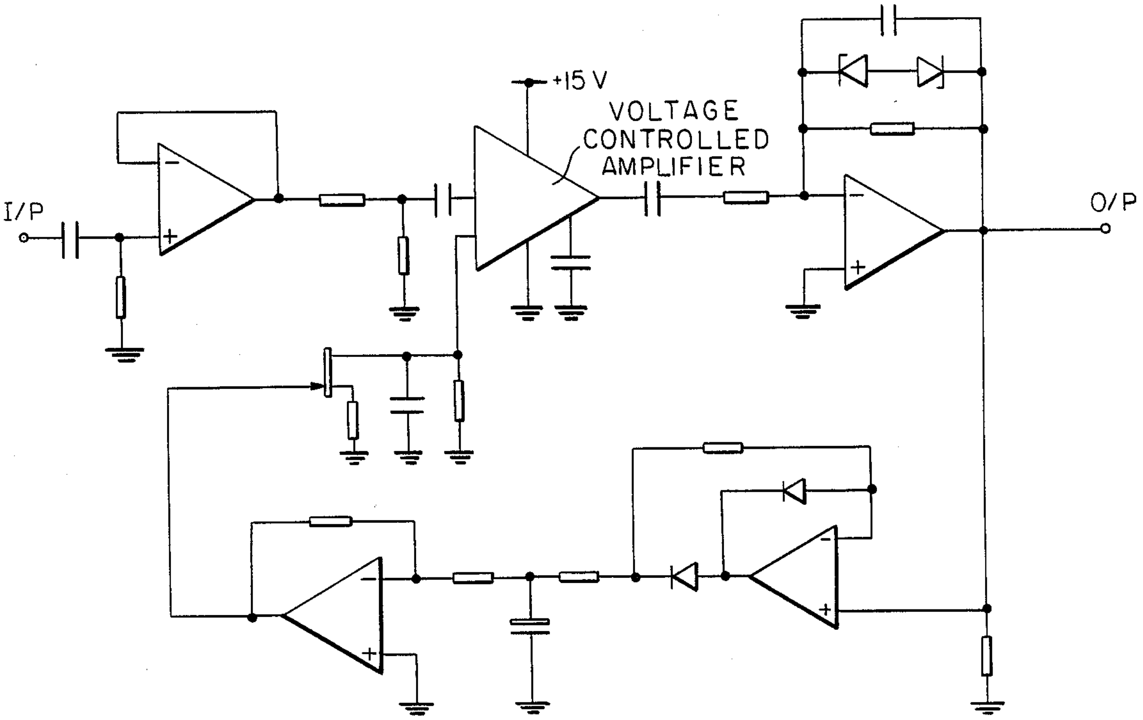
FIG. 7 is a block circuit diagram of the input stages of the decoder of FIG. 4.

The decoder input circuit may be modified to include an A.G.C. path, the action of which is to minimise the fluctuations of the code frequencies due to the programme envelope level changes, the code insertion level being dependent on programme level. A circuit of this function is shown in FIG. 7.

Figure 8:
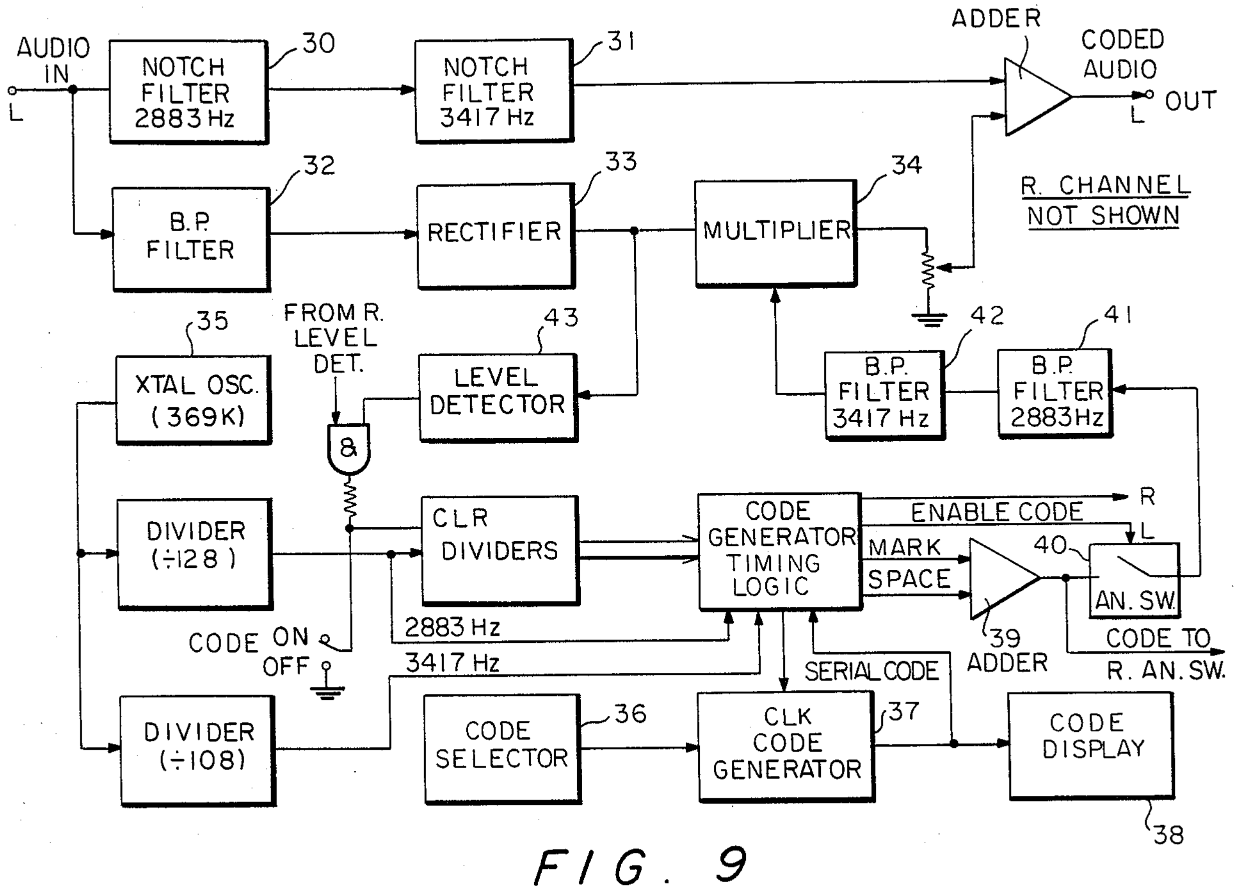
FIG. 8 is a block circuit diagram of another encoder embodying the present invention.
Figure 9:
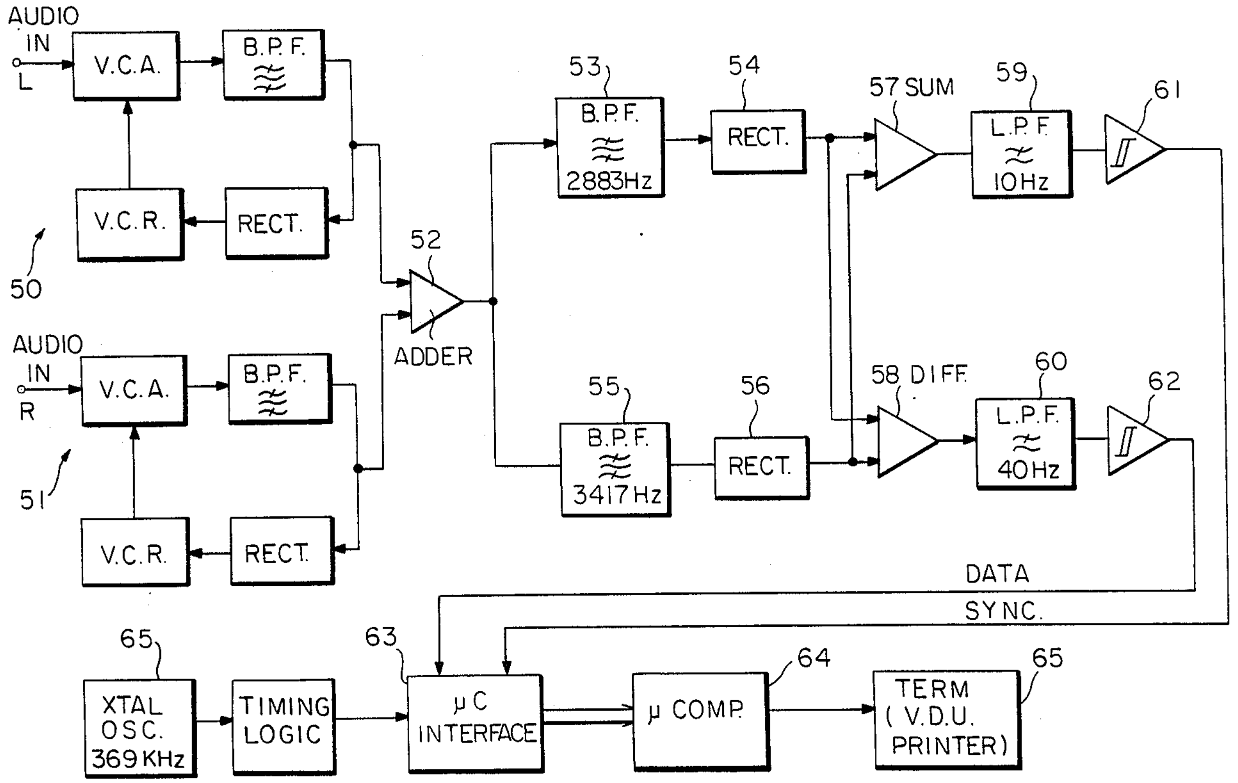
FIG. 9 is a block circuit diagram of another decoder embodying the present invention.

There is shown in FIGS. 8 and 9 equipment embodying another form of the present invention. This system utilises a signal transmitted in digital form whereby each of the states is represented by a short burst of a discrete frequency of approximately 22 msec in duration. This duration is chosen to allow the decoder time to recognise individual digits, bearing in mind the fairly high Q of the bandpass filters, while keeping the overall transmission time as short as possible. The signal consists of a preamble of 8 digits duration represented by both the discrete frequencies being present together, the preamble being immediately followed by a 32 bit code sequence. The first 8 bits of the code sequence are used to designate the Recording Company (i.e. enough capacity to identify 256 Companies), the following 24 bits provide in excess of 16 million address locations in a micro computer memory associated with the decoding equipment. Each location is capable of storing all the relevant information appertaining to each recording. Thus the total code duration including the preamble is 880 msec.

Since any stereo signal may be combined to form a mono signal, information is not encoded into the left- and right-hand channels simultaneously. It is also desirable to make the code insertion as brief as possible to keep the possibility of aural detection to a minimum. Accordingly, in stereo audio signals, the preamble plus the first 16 bits of the code are inserted into one stereo channel, immediately followed by the remaining 16 bits of the code in the other stereo channel. The stereo channel receiving the first part of the code is alternated between left and right.

The encoder of FIG. 8 may be considered as part analogue and part digital. Each channel of the analogue section has two paths. The first is concerned with the main signal into which are introduced the two notch filters 30 and 31 which create the regions into which the code will be placed. The other path is concerned with the control of code amplitude and subsequent insertion into the main signal channels. The control path of each audio channel is passed through a bandpass filter 32 which is shaped such that the control signal amplitudes applied to a multiplier 34 after rectification at rectifier 33, will depend on the masking ability of the programme content. A manual control allows the level to be set at which the code is inserted below the programme envelope level.

The digital section generates the coding frequencies which are divided down from the output of a crystal oscillator 35. All other timing waveforms are derived from these frequencies which govern the bit duration, code length, repetition rate, and so on. The code may be selected via a keyboard 36 when the chosen digital code will be generated at generator 37 and displayed at display 38. The digital code is then converted into a pulse sequence of the appropriate frequencies namely 2883 Hz representing a space or 0, and 3417 Hz representing a mark or 1. There are, of course, a number of frequencies which could be used for this purpose in alternative forms of the equipment to that as shown. The mark and space elements of the code, still in digital form, are summed at adder 39 to produce the complete 32 bit code plus the preamble. The serial code sequence then passes via an analogue switch 40 to filters 41 and 42 which transform the serial pulse sequence into sine waveforms. This analogue format of the code is then applied to the other input of the multiplier 34.

The level of the programme is sensed by a detector 43 which goes low if the programme falls below a predetermined level. This then clears the dividers (via an AND Gate) and stops the code generation until both channel detectors go high. The code is then inserted at approximately 1½ second intervals. The analogue switches are used to control the code insertion alternating between the left- and right-hand channels.

In the decoder shown in FIG. 9, each channel of a received stereo signal is separately processed in an automatic gain controlled loop 50 or 51 to bring the variable code amplitudes up to a uniform level before detection. The bandpass filter section in the AGC loop isolates the code frequencies from the programme content. The output from the left- and right-hand channels are then summed negatively at adder 52 which results in the full 32 bit code plus preamble being present at the summing amplifier output.

The frequencies representing the mark and space digits are then processed separately via their individual bandpass filters and rectifiers 53 to 56. The bandwidth of the filters are made wider than the encoder notches to allow for speed variations in the reproducing equipment. Assuming this equipment to be of professional standard, the tolerance on speed variation should be reasonably tight. This difference between the encoder notch filters and the decoder bandpass filters inevitably allows some programme breakthrough into the code demodulation circuits resulting in occasional code mutilation. The rectified outputs from the bandpass filters result in complementary code sequences. Thus when the code contains a 1, the higher frequency path will be high and the lower frequency path low. Conversely, when the code contains a zero the lower frequency rectified output will be high and the higher frequency output low. The advent of the preamble results in both outputs being high. When the two outputs are applied to a summing amplifier 57 a pulse of double amplitude and of 8 bits duration appears at its output when the preamble is present. The output of different amplifier 58 is zero. Subsequently with the passage of the code, the difference output indicates the code at double amplitude while the sum output is substantially zero.

After suitable low-pass filtering at filter 59 or 60 and passage through a Schmitt Trigger circuit 61 or 62, the pulse resulting from the preamble is used as a synchronising signal in the microcomputer interface circuit 63 to read the data into the computer 64 via the interface. All timing is derived from a crystal clock 65 similar to the one used in the encoder.

The software programme used by the microcomputer 64 lists all full 32 bit data message received from the aforementioned decoder circuitry and displays them on a VDU 65. If the data has been foreshortened due to the signal source level going below the required threshold level for whatever reason, the incomplete data will be ignored. The computer averages each column of digits over the last ten received. The decision level may be selected. In the present embodiment this is chosen as 6 out of 10. Thus if 6 or more 1's occur in a column of 10 listings of the 32 bit code the correct data is assumed to be a 1. Conversely if 6 or more zeros are present in a column the correct data is assumed to be zero. If the average is 5 then the computer indicates "DONT KNOW" (—) and the code is then incomplete. The averaged code is listed in a separate column in hexadecimal notation together with the time elapsed from the commencement of the transmission. The first full averaged code (i.e. no dashes) is then transferred to a "message received" column together with the time. This is the address which will eventually be used to interrogate the computer memory to extract the information about the recorded repertoire and to which company it belongs. This information may then be displayed or printed out or stored in memory for subsequent use.

Thus, an identification code for insertion within a signal may have a sequence of frequency-shifted segments and a sync signal formed of a simultaneous burst of the frequencies in the segments.

Also, the identification code for insertion within a signal may have two notches each centred on one of the frequencies of the segments. Also the identification code may have two notches each centred on one of the frequencies of the segments such that each frequency is inserted in a different notch.

This identification code may be electronically buried in the audio analogue signal such that it can be recognised in any carrier medium, e.g. radio transmission, cable distribution, tape, disc or film audio or video recording, either optical, magnetic or electro-mechanical.

The code is carried on two frequencies, one representing a space digit (0) and one a mark digit (1). Thus the absence of one frequency will coincide with the appearance of the other. In a stereophonic recording the lefthand channel may be compared with the right. Thus a double cross-check may be made on each code digit and used as part of an error detection and correction scheme.

The code frequencies are accommodated within the audio bandwidth utilizing two very narrow notches in the programme frequency spectrum. The exact centre frequency of each notch is chosen as a quarter tone between tow semitones of the tonal scale, for example in the third octave above middle C. This places the code frequencies in parts of the spectrum where the programme content should be minimal, being beyond the range of most instruments and not lying on a harmonic of lower notes of the tonal scale. It also ensures that the presence of a notch does not eliminate a note of the tonic scale in musical programme material.

In an identification code, a synchronising word precedes the segments to alert the decoding equipment of their imminent arrival. This consists merely of a burst of both the code frequencies simultaneously for a fraction of a second. The following code may consist of several alpha-numeric characters, the exact number being determined by the amount of information it is required to transmit. Each character is described by 8 digits, with one digit used for parity checking; each is represented by a number of cycles of the designated frequency. Thus the total message, sync work plus code, is approximately one second in duration. In order to minimise the length of the code it may merely represent an address, the relevant information being held in a computer memory.

The code frequencies and all the timing functions are generated by binary division from a master crystal oscillator. Thus the number of code frequency cycles per digit, the length of the synchronising address and the message duration are all accurately defined.

The sharp notch filters are generated by combinations of biquad circuits.

The code is not introduced into the programme material if its level falls below a predetermined value such that adequate masking is not provided. All coding circuits are removed from the transmission path except for the duration of the code. Thus for approximately 95% of the time the transmission path is normal.

In the decoder, bandpass circuits are employed to extract the code from programme material. The passband is of sufficient width to accept the code and allow for a reasonable degree of speed variation in the transducing equipment. However this should be fairly small since the equipment is of professional standard. Any appreciable speed variation constitutes a pitch change if constant, or wow and flutter if variable. Errors in transmission are checked by the clues provided in the code format and in the character parity check. The information so gained will be used to invoke a correction routine. This may be accomplished in any computing facility used in an embodiment.

The decoded information is then fed to a micro-computer capable of a V.C.U. display and/or hardcopy output.

The present invention provides an identification code with the following characteristics:

(i) the code is completely inaudible under all conditions;

(ii) it impairs in no way the fidelity of any recording no matter what are its contents;

(iii) the code is embedded well within the audio bandwidth and not at either extremity where it could easily be filtered out by accident or design, thereby to protect the code from deliberate attempts to obliterate it simply;

(iv) the code is totally secure during any transfer process, such that is survives high speed tape-to-tape duplication, transfer to disc (analogue or digital), cable transmission and broadcasting, enabling the system to be of a universal application;

(v) the code need not be included at regular intervals thereby avoiding deliberate interference and also facilitating maximum masking by the performance content;

(vi) the code can be repeated at frequent intervals, ensuring that even short extracts from a recording may be identified, that rapid identification of material can be achieved, and that repeated verification of the code tends to isolate errors due to programme breakthrough.

In a different application, the identification code of the present invention may include information which may instruct equipment, which receives the signals containing the identification code, to inhibit certain actions, for example recording.

We claim:

1. Apparatus for the labelling of signals, said apparatus having an encoder circuit comprising:

means to eliminate at least two particular, predetermined frequency bands from a given signal to form corresponding notches therein;

means to insert a code sequence into said notches, the code comprising frequencies corresponding to the respective centre frequencies of the notches;

means to inhibit the insertion of said notches and hence said code sequence when the signal frequency lies outside a specified range;

means to monitor the amplitude of the said signal and means to set the code amplitude at a predetermined level below the signal amplitude level, so that the code level varies with the signal level.

2. Apparatus according to claim 1, wherein the inhibit means is operable to prevent insertion of said notches and said code sequence when the signal substantially consists of frequencies below 1 KHz and/or above 6 KHz.

3. Apparatus according to claim 1, comprising means to inhibit insertion of the code sequence when the monitoring means indicates a value below a specified level.

4. Apparatus according to claim 1, comprising means to locate one section of a code sequence in a channel of a multichannel signal and another section, following on from the said one section, of the code sequence in a different channel of the multiple-channel signal.

* * * * *